United States Patent [19]

Schmidhuber et al.

[11] Patent Number: 5,039,161
[45] Date of Patent: Aug. 13, 1991

[54] SLIDING OR SLIDING-LIFTING ROOF FOR CARS

[75] Inventors: Karl Schmidhuber, Alzenau; Dieter Federmann, Hanau; Horst Böhm, Frankfurt am Main, all of Fed. Rep. of Germany

[73] Assignee: Rockwell-Golde GmbH, Fed. Rep. of Germany

[21] Appl. No.: 434,193

[22] Filed: Nov. 13, 1989

[30] Foreign Application Priority Data

Dec. 1, 1988 [DE] Fed. Rep. of Germany ....... 3840491

[51] Int. Cl.⁵ .............................................. B60J 7/04
[52] U.S. Cl. .................................. 296/212; 296/216; 49/477; 49/483; 49/497
[58] Field of Search ............... 296/212, 216, 221, 222; 49/477, 483, 495, 497, 498

[56] References Cited

U.S. PATENT DOCUMENTS

| 1,767,165 | 6/1930 | Bickett | 49/498 |
| 3,461,611 | 8/1969 | Axe | 49/483 |
| 4,308,302 | 12/1981 | Etter et al. | 49/498 X |
| 4,765,676 | 8/1988 | Grimm et al. | 296/218 X |

FOREIGN PATENT DOCUMENTS

| 819639 | 11/1951 | Fed. Rep. of Germany | 296/216 |
| 911376 | 5/1954 | Fed. Rep. of Germany | 49/483 |
| 1755619 | 8/1971 | Fed. Rep. of Germany | 296/218 |
| 3632166 | 4/1987 | Fed. Rep. of Germany | 296/222 |
| 3630461 | 3/1988 | Fed. Rep. of Germany | 296/216 |
| 2165194 | 4/1986 | United Kingdom | 296/222 |

Primary Examiner—Dennis H. Pedder

[57] ABSTRACT

In a sliding or sliding-lifting roof for a car, a lid, associated with a roof opening for the purpose of completely closing it, has a front edge which is wedge-shaped in cross-section. A sealing profile, sealingly filling the gap between the fixed vehicle roof and the lid when the lid is closed, is pushed from below onto a downward flange of the fixed vehicle roof and is deformable to form a trough, generally complementary in shape to the wedge shape. The wedge-shaped front edge here engages generally form-fittingly and force-transmittingly into the sealing profile, so that the lid, at its front edge due its engagement with the sealing profile, is reliably secured against high uplift forces, such as occur at high speeds of travel.

11 Claims, 3 Drawing Sheets

1

SLIDING OR SLIDING-LIFTING ROOF FOR CARS

FIELD OF THE INVENTION

This invention relates to a sliding or sliding-lifting roof for cars.

In known vehicle roof constructions of this type (German Patent 34 42 653c1), the lid bears sealingly with an essentially vertical surface at its front edge against the sealing profile fixed to the roof opening edge. This bearing of the front edge of the lid against the sealing profile is unsuitable for accepting forces orientated perpendicularly to the lid surface. Such forces occur during travelling as uplift forces. With increasing speed of travel, the uplift forces acting on the closed lids of roof constructions increase, and in the majority of roof constructions must be accepted exclusively by the sliding elements engaging into the guide rails fixed laterally in the roof opening.

If extremely fast cars are equipped with such roof constructions, there is a risk at high speed, with the roof closed, that the uplift forces can tear the lid out of the roof opening. Because the lateral guide rails cannot be constructed to continue as far as the forward roof opening edge, because the roof opening is more or less rounded at its corners, the forward sliding elements are at an appreciable distance from the front edge of the lid.

In order to avoid an undesired dip of the front edge of the lid when the lid of a sliding/lifting roof is swung upwards and open, it is necessary to arrange the lid pivot bearing near the front edge of the lid. In order to counteract the uplift forces, however, it is advantageous to arrange the lid pivot bearing if possible directly at the front sliding elements. These cannot, however, for the reasons stated be arranged in the vicinity of the front edge of the lid. It is therefore usual to bridge across the distance between lid pivot bearing and the forward sliding elements by forwardly orientated extension arms, which are fixed to the sliding elements. The lid is articulated to the free ends of these extension arms. As a result of this arrangement, when the lid is closed, the extension arms are loaded in bending in the manner of a beam clamped at one end, with the consequence that the front edge of the lid can be lifted upwards when considerable uplift forces occur.

DESCRIPTION OF THE PRIOR ART

In one known sliding roof (DE-PS 35 35 126), the sliding lid is secured against the risk of tearing out at high vehicle speeds by the sealing profile, fixed in this case to the sliding lid, engaging beneath the edge of the roof opening with a sealing lip supported by the rim of a holding frame secured to the lid. Additionally, a supporting lever may be fixed to the holding frame in the vicinity of the front edge of the sliding lid and generally parallel to it on both sides of the lid, which supporting lever engages with its outer end beneath the lateral, fixed vehicle roof and bears there from below against a guide track fixed to the vehicle roof. This very effective lid securing system can be used, however, only for sliding roofs, but not for a sliding-lifting roof, in which the lid can be raised out above the rear, fixed roof surface.

An object of the present invention is to provide a sliding or sliding-lifting roof in which the front edge of the lid, even at high speeds of travel and therefore when high uplift forces act upon the lid surface, shall be reliably secured against lifting up.

SUMMARY OF THE INVENTION

According to the present invention, there is provided a sliding or sliding-lifting roof construction for a car, comprising a rigid lid, which in its closed position closes a roof opening in the fixed vehicle roof, a downwardly orientated flange extending from the edge of the roof opening, a sealing profile pushed from below onto said flange, which sealing profile, when the lid is closed, sealingly fills a gap between the edge of the roof opening and the periphery of said lid and is of elastically deformable construction in the region of said gap, a front edge of the lid having a wedge-shaped cross-section over at least a portion of its length and the sealing profile, at least in the region of the wedge-shaped form of said front edge being deformable to form a trough generally complementary to the wedge shape and having a substantially non-deformable material thickening adjacent the trough which is arranged to bear against said flange and, when the lid is closed, against the upper wedge surface of the front edge of the lid.

As a result of the present construction, the front edge of the lid, in its closed position, engages virtually form-fittingly into the sealing profile, which as a consequence of its special shape cannot escape upwards when uplift forces occur. The closed lid therefore bears with its front edge firmly against the sealing profile, which also cannot be stripped away upwards, because it cannot be displaced further upwards since it is pushed from below onto the downward flange of the roof opening edge.

A special construction of the sealing profile at the forward edge of the roof opening is not necessary, but the sealing profile may have a continuous, uniform cross-section around its entire periphery. If the front edge of the lid is formed with a wedge-shape throughout its length, a form-fitting, force-transmitting engagement of the front edge of the lid with the sealing profile situated at the forward edge of the roof opening is advantageously obained extending virtually over the entire length of the front edge.

With advantage, the sealing profile is constructed as a hollow chamber profile. By the forming of the internal trough inside the hollow chamber of the sealing profile, the trough provided for the desired form-fitting and force-transmitting engagement of the front edge of the lid is obtained in the interior of the sealing profile, without being visible from outside when the sealing profile is not compressed. The outwardly bulging, thinner profile wall makes possible an elastically prestressed, sealed bearing against the lateral edges and the rear edge of the lid.

The hollow chamber of the sealing profile is preferably filled with air and sealed so that, when the lid is closed, the air is expelled out of the hollow chamber of the sealing profile disposed in the forward region of the roof opening and enters the hollow chamber portions of the sealing profile lengths situated at the lateral edges and rear edge of the lid, where it ensures that the wall zones of the profile facing towards the lid are additionally pressed against the outer edges of the lid, in order to increase the sealing effect.

An outer edge of the front edge of wedge-shaped cross-section of the lid can be rounded and, together with the base of the firstmentioned trough, the result is achieved that by the engagement of the front edge of the lid with the correspondingly-shaped sealing profile at the forward edge of the roof opening, a pivot bearing for the lid is formed.

BRIEF DESCRIPTION OF THE DRAWINGS

For a better understanding of the invention and to show how the same may be carried into effect, reference will now be made, by way of example, to the accompanying drawings, in which.

DESCRIPTION OF THE PREFERRED EMBODIMENTS

Figure 1:
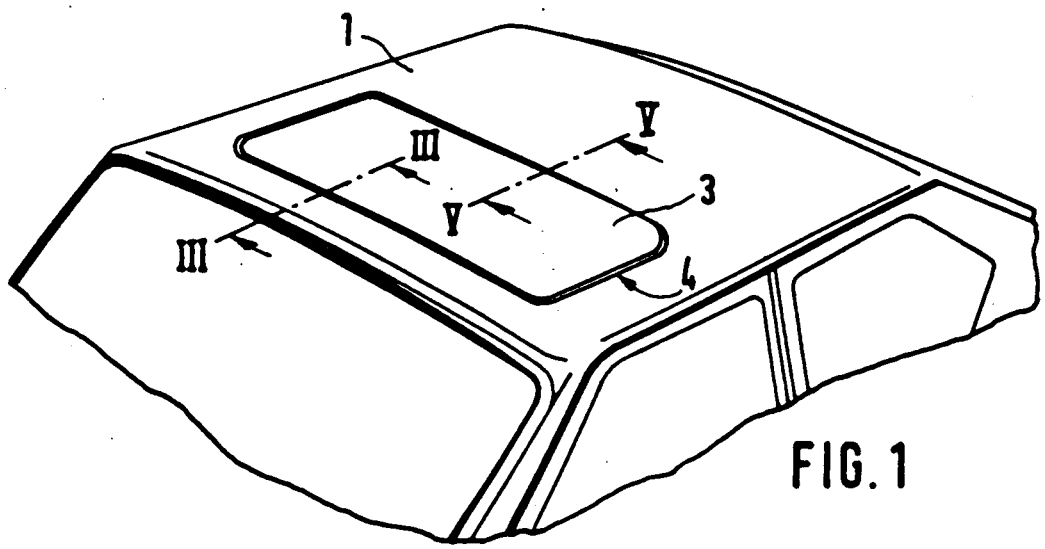
FIG. 1 is a partly cut-away perspective view of a roof of a passenger car with installed sliding or sliding-lifting roof and with the lid closed.
Figure 2:
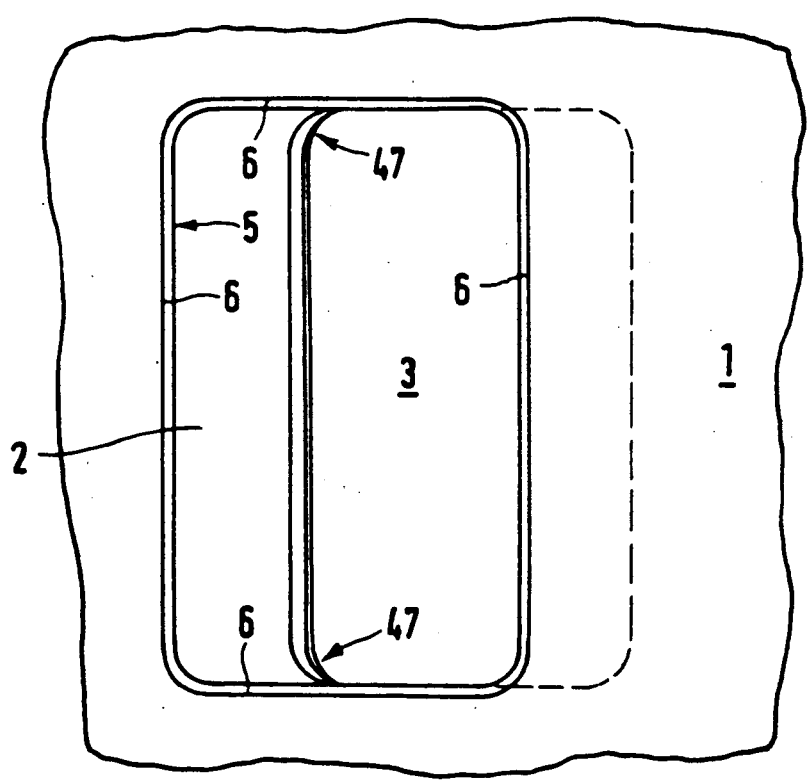
FIG. 2 is a cut-away plan of the car roof with the lid partly slid open.

From FIGS. 1 and 2, a fixed vehicle roof 1 can be seen, in which a roof opening 2 with rounded corners is situated, which can be closed by a correspondingly shaped, rigid lid 3 of a sliding or sliding-lifting roof construction. In the closed condition (FIG.1) a peripheral edge gap 4 of constant width is situated between the fixed vehicle roof 1 and the lid 3. For sealing this edge gap 4 when the lid 3 is closed, a sealing profile 5 is provided, which is fixed to the edge 6 of the roof opening.

As can be seen from the cross-sectional illustrations, the roof opening edge 6 is formed of a rectangular downwardly-extending flange 7 of sheet material from which the fixed vehicle roof 1 is made. At its lower end, the flange 7 of the roof opening edge 6 is provided with an upwardly bent inner rim 8. Between the flange 7 and the inner rim 8, a cranked rim 9 of a roof reinforcing frame 10 is folded in, which frame is fitted underneath the fixed vehicle roof 1 and surrounds the roof opening 2. Flange 7, cranked rim 9 and inner rim 8 constitute a seating laminated from three thicknesses of plate for a sealing profile 5, which is to be pushed on upwardly from below.

The sealing profile 5, of an elastomeric material, possesses for the purpose an upwardly open groove 11, which is formed between a fixing arm 12 of the sealing profile 5 and its main part, associated with the edge gap 4. The fixing arm 12 possesses an inwardly orientated projection 13, which engages with the inner rim 8 when the sealing profile 5 is pushed on. In the example illustrated, a hollow chamber 14 is formed in the main part of the sealing profile 5, which is shaped to extend with constant cross-section around the edge 6 of the roof opening. As FIG. 3 shows, due to its special form of construction, the sealing profile 5 can be deformed by the correspondingly shaped front edge 15 of the lid 3 into a depression or trough 16, when the front edge 15 is pressed against the sealing profile 5.

The hollow chamber 14 is bounded, on the one hand, by a thicker profile wall 17, bearing against the edge 6 of the roof opening and, on the other hand, by a comparatively thinner, outwardly bulging profile wall 18. Into the thicker profile wall 17, an inner trough 19, corresponding to the trough 16, is moulded, which due to its shape decides the shape of the trough 16, when the sealing profile 5 is elastically deformed in the manner illustrated in FIG. 3 with complete compression of the hollow chamber 14. the trough 16 or inner trough 19 is adjoined upwards by a substantially non-deformable or undeformable material thickening 20, which is a component of the thicker profile wall 17 and defines the shape of the inner trough 19. A corresponding material thickening 21 also adjoins the trough 16 and inner trough 19 below.

Figure 3:
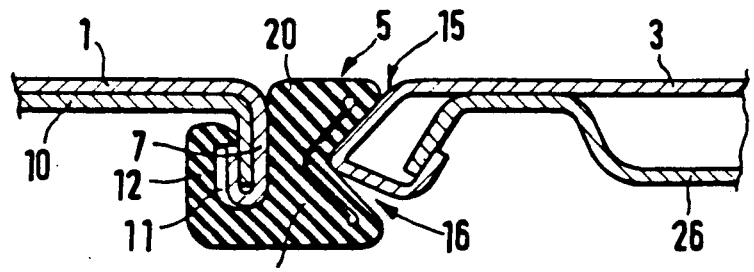
FIG. 3 is a section through the region of the forward edge of the roof opening and front edge of the lid with the lid closed, taken on the line III—III in FIG. 1.

To prevent lifting of the front edge 15 of the lid 3 out of the position shown in FIG. 3 during high speed travel, the fitting and construction of the material thickening 20 are of importance. When uplift forces act upwards on the lid 3, an upper wedge face 22 of the front edge 15 of the lid bears firmly against the material thickening 20, through the intermediary of the adjacent part of the thinner profile wall 18, and the material thickening 20 for its part bears against the roof opening edge 6. The upwardly orientated uplift forces tend to displace the sealing profile 5 upwards, but this is prevented by the engagement of the groove 11 with the push-on seating for the sealing profile 5, composed of the downward flange 7, cranked rim 9 and inner rim 8.

The front edge 15 (35) of the lid 3 is wedge-shaped in cross-section at least over a part of its length, as FIGS. 3, 4 and 6 to 8 all show. the trough 16, or inner trough 19 generating this trough 16, is formed in complementary shape to the wedge shape of the front edge 15. Preferably, the arrangement of the front edge 15 is such that it is continuously of wedge-shape throughout its length, the wedge shape being blunted or tapered off to vertical surfaces at the lateral edges at rounded transitions 47 (FIG. 2) to the lateral edges of the lid 3.

Figure 4:
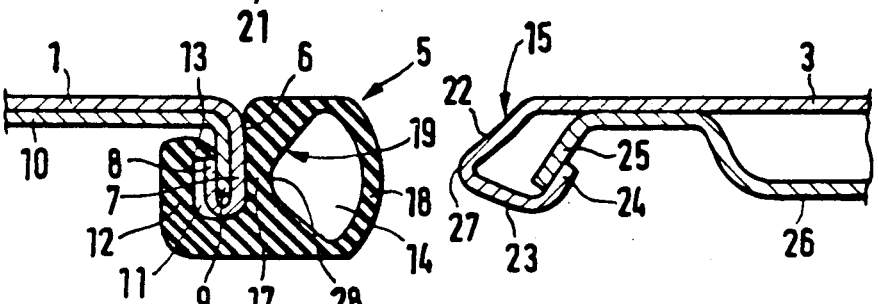
FIG. 4 is a section similar to FIG. 3, with the lid slid open.

In the embodiment of the lid 3 illustrated in FIGS. 3 and 4, this lid is made from sheet material, which is first bent outwards and downwards to form the wedge shape, thus producing the upper wedge face 22. Adjoining this, the sheet material is bent inwards and downwards to form a lower wedge face 23 and finally it terminates with an inwardly and upwardly bent rim 24. The rim 24 overlaps an outwardly, downwardly bent outer rim 25 of a lid reinforcement 26, fixed to the lid 3. As FIGS. 3 and 4 show, the outer edge 27 of the front edge 15, connecting together the two wedge faces 22 and 23, is so disposed in its height position that it is opposite the base 28 of the inner trough 19 and, when the lid 3 is closed, displaces the central zone of the thinner profile wall 18 into the base 28.

Figure 5:
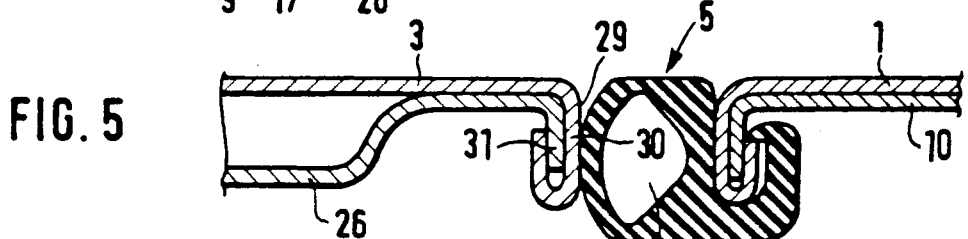
FIG. 5 is a section through the region of the rear edge of the roof opening and rear edge of the lid, with lid closed.

At its rear edge and two lateral edges, the lid 3 illustrated in FIGS. 3 and 4 is constructed as shown in FIG. 5. As can be seen, the lid 3 possesses, at these edges, vertically oriented surfaces 29, which are formed on perpendicular flanges 30. At their end. the flanges 30 are bent upwards again to form a fold for a downwardly pointing flange 31 of the lid reinforcement 26. The outwardly bulging profile wall 18 of the sealing profile 5 bears sealingly and with elastic prestress against the surfaces 29. If the hollow chamber 14 of the sealing profile is sealed throughout its peripheral length and at the joint position, and is filled with air, then when the front edge 15 of the lid 3 penetrates into the portion of the sealing profile 5 situated at the forward edge of the roof opening, the air is expelled from the hollow chamber 14 and passes into the hollow chamber portions situated laterally and at the rear against the lid, causing the air pressure in these zones of the hollow chamber to rise. This leads to an additional pressing action of the profile wall 18 against the vertical faces 29 of the edge of the lid.

Figure 6:
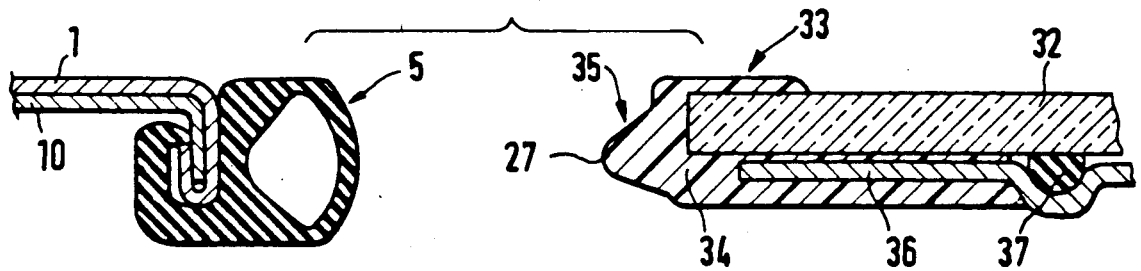
FIGS. 6 to 8 are sections similar to FIG. 4 with different forms of construction of the lid.
Figure 7:
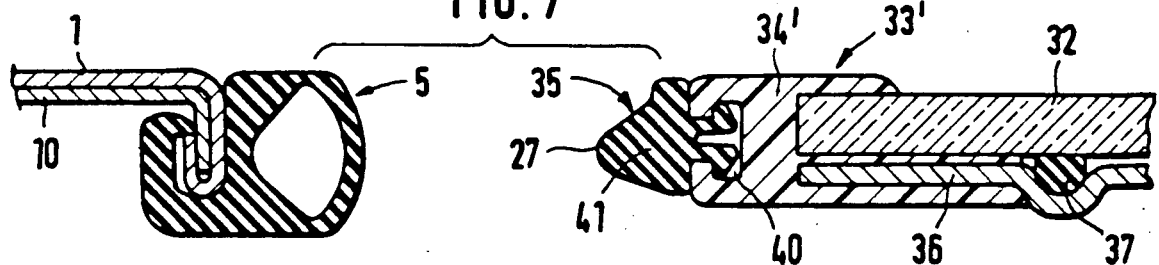
Figure 8:
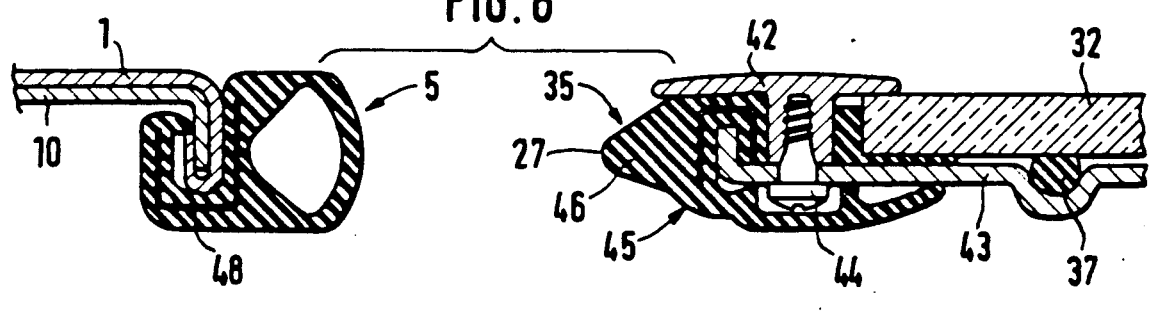

In the examples shown in FIGS. 6 to 8, instead of the lid made from sheet material, a glass lid 32 is provided in each case. In the embodiment according to FIG. 6, the glass lid 32 is surrounded by a moulded-on plastics frame 33, the front edge 35 of which forms the lid front edge, of wedge-shape in cross-section. The lid reinforcement 36 is also embedded into the moulded-on plastics frame 33, a peripheral cord 37 being provided between the glass lid 32 and lid reinforcement 36.

In the embodiment according to FIG. 7, a plastics frame 33' is also injection-moulded onto the glass lid 32 all around and a groove 40 is moulded in the forward frame part 34' of the frame 33'. By means of this back-cut groove 40, a profile strip 41 is fixed by snap engagement onto the frame part 34', which profile strip 41 constitutes the front edge 35 of the lid and is wedge-shaped in cross-section.

In the embodiment according to FIG. 8, the outer rim of the glass lid 32 is clamped between an upper covering frame 42 and a lid reinforcement 43, underlying the glass lid 32. The cover frame 42 and lid reinforcement 43 are firmly connected to each other by screws 44. An outer edge profile 45 is secured between the covering frame 42 and lid reinforcement 43 and is present along all four sides of the lid. At the front edge of the glass lid 32, the edge profile 45 projects outwards beyond the covering frame 42 with a projection 46, which is wedge-shaped in cross-section.

In all the examples shown in FIGS. 3, 4 and 6 to 8, the lid 3, 32 respectively is constructed as wedge-shaped in cross-section at its front edge on account of the described arrangements, so that in all cases, when the lid is closed, the desired form-fitting and force-transmitting engagement with the sealing profile 5 at the forward edge of the roof opening is present.

Figure 9:
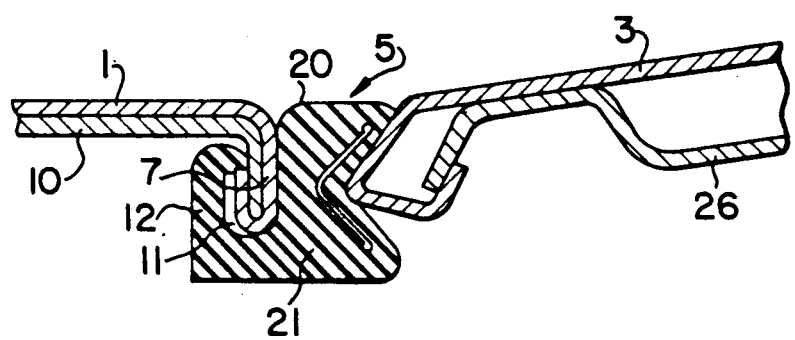
FIG. 9 is a sectional view similar to FIG. 3, but with a rear end of the lid lifted to open the lid in a tilted position.

Since the outer edge 27 of the front edge, wedge-shaped in cross-section, of the lid is rounded in each case, this outer edge forms, together with the base 28 of the trough 16, a pivot bearing for the lid, i.e. when the lid is tilted out of its closed position by raising the rear edge of the lid above the fixed vehicle roof 1 as shown by FIG. 9, the lid bears with the rounded, outer edge 27 against the base of the trough in the manner of a pivoting or tilting bearing.

The sealing profile 5 may be provided, for the purpose of internal stiffening, in the manner shown in FIG. 8, in all embodiments of the invention with a U-shaped, moulded-in steel reinforcement 48, which surrounds the sheet metal composite consisting of downward flange 7, cranked rim 9 and inner rim 8.

The sealing profile 5 does not need to be made from the same elastomeric material throughout its cross-section. Thus, for example, it is possible to make the sealing profile in the region of its fixing arm 12 and its thicker profile wall 17 possessing the material thickened zones 20 and 21, of a harder material which is joined to a softer material forming the inner profile wall 18. In an appropriate construction, the hollow chamber 14 may also be filled with a softer, perhaps foam material. The profile strip 41, in the embodiment according to FIG. 7, and the edge profile 45 with its projection 46 in the embodiment according to FIG. 8, are also made from a comparatively hard material.

We claim:

1. An automobile roof construction comprising:
   (a) a fixed vehicle roof (1) having means including a downwardly oriented flange (7) defining an opening in said fixed roof;
   (b) a sealing profile (5) secured on said downwardly oriented flange (7), said sealing profile (5) including (i) an upper, substantially non-deformable body portion (20) and a lower substantially non-deformable body portion (21) that are backed on one side by said flange (7) and define on the opposite side from said flange (7) a generally wedge-shaped concave inner trough (19) and (ii) a deformable profile wall (18) that extends away from said flange (7) and said non-deformable body portions (20, 21) and encloses a hollow chamber (14);
   (c) a rigid lid (3, 32) including a front edge for sealing engagement with said sealing profile mounted for sliding and tilting movement within the roof opening in said fixed roof (1) to provide opening and closing thereof, and
   (d) means (15, 35) on the front edge of said rigid lid having a substantially non-deformable wedge shape generally complementary to the shape of said trough (19) to press said deformable profile wall (18) against said trough (19) defined by said substantially non-deformable body portions (20, 21) and thereby seal said rigid lid against said sealing profile, provide a forward pivot for said rigid lid (3, 32) and prevent uplifting of the front edge of said rigid lid.

2. An automobile roof construction according to claim 1, wherein the sealing profile is formed continuously of the same cross-section around the edge of the roof opening and the means on the front edge of the rigid lid is formed across a major portion of the width of said rigid lid with a wedge-shape and is formed with rounded transitions to the lateral edges of the rigid lid.

3. An automobile roof construction according to claim 1, wherein the hollow chamber of the sealing profile is sealed and filled with air.

4. An automobile roof construction according to claim 1, wherein an outer edge of the wedge-shaped means on the front edge of the rigid lid is rounded and said rounded outer edge of said wedge-shaped means and a base of the concave inner trough form a pivot bearing for the rigid lid.

5. An automobile roof construction according to claim 1, wherein the rigid lid is glass, a frame of plastic material is injection moulded onto the glass, a groove is formed in said frame at the front edge of said rigid lid, said means having a substantially non-deformable wedge shape is a profile strip which is wedge-shaped in cross-section, and said profile strip is fixed in said groove and extends over at least a part of the length of the front edge of the rigid lid.

6. An automobile roof construction according to claim 1, wherein the rigid lid is glass, said means on the front edge of the rigid lid having a substantially non-deformable wedge shape is a frame of plastic material injection moulded onto the glass.

7. An automobile roof construction according to claim 1, wherein the rigid lid is glass, the rigid lid is clamped at an outer rim portion between an upper covering frame and a lid reinforcement, said means on the front edge of said rigid lid having a substantially non-deformable wedge shape is an external edge profile having a wedge-shaped cross-section and secured between the covering frame and the lid reinforcement, and said edge profile extends over at least a part of the length of the front edge of the rigid lid.

8. An automobile roof construction according to claim 2, wherein the wedge shape at the rounded transitions to the lateral edges of the rigid lid are gradually blunted or tapered off to vertical surfaces.

9. An automobile roof construction according to claim 1, wherein a steel reinforcement is moulded in said sealing profile.

10. An automobile roof construction according to claim 1, wherein the rigid lid is comprised of a sheet of metal and further includes a lid reinforcement and a front edge of said sheet is bent to provide said means having a substantially non-deformable wedge shape.

11. An automobile roof construction according to claim 10, wherein the front edge of the sheet is first bent downwards, then inwards and downwards and terminates with an inwardly and upwardly bent rim, which laps an edge portion of an outwardly and downwardly bent outer rim of said lid reinforcement.

* * * * *